United States Patent [19]

Kleckner

[11] Patent Number: 5,036,235
[45] Date of Patent: Jul. 30, 1991

[54] BRUSHLESS DC MOTOR HAVING A STABLE HYDRODYNAMIC BEARING SYSTEM

[75] Inventor: Robert J. Kleckner, N. Tarrytown, N.Y.

[73] Assignee: Xerox Corporation, Stamford, Conn.

[21] Appl. No.: 557,108

[22] Filed: Jul. 25, 1990

[51] Int. Cl.$^5$ ............................................. F16C 39/06
[52] U.S. Cl. ..................... 310/90.5; 310/51; 310/191; 310/268; 384/107; 384/133
[58] Field of Search ............... 310/90.5, 51, 52, 344, 310/90, 67 R, 268, 156, 191, 192, 190, 273; 384/124, 107, 133; 346/108

[56] References Cited

U.S. PATENT DOCUMENTS

| 2,761,079 | 8/1956 | Giertz-Hedstrom | 310/82 |
| 3,612,630 | 10/1971 | Rosensweig | 308/10 |
| 4,135,119 | 1/1979 | Brosens | 318/128 |
| 4,552,417 | 11/1985 | Yamashita et al. | 310/90 |
| 4,599,664 | 7/1986 | Schuh | 360/97 |
| 4,647,803 | 3/1987 | von der Heide et al. | 310/67 R |
| 4,734,606 | 3/1988 | Hajec | 310/90.5 |
| 4,851,731 | 7/1989 | Saotome et al. | 310/51 |
| 4,896,065 | 1/1990 | Tsuyama | 310/154 |

Primary Examiner—Steven L. Stephan
Assistant Examiner—Edward H. To
Attorney, Agent, or Firm—Oliff & Berridge

[57] ABSTRACT

A brushless DC motor having a hydrodynamic bearing system includes a stator core having windings arranged thereabout, the stator core rotating about a first center line. The motor further includes a rotor having permanent magnets positioned about an inner diameter thereof, said rotor being rotatable about a second center line. The first center line of the stator core is eccentric to and parallel to the second center line of the rotor such that the magnets exert forces on the stator core which eliminate whirl instability in the rotor.

30 Claims, 9 Drawing Sheets

BRUSHLESS DC MOTOR HAVING A STABLE HYDRODYNAMIC BEARING SYSTEM

BACKGROUND OF THE INVENTION

1. Field of the Invention

The present invention relates to a brushless DC motor and, more particularly, to a brushless DC motor having a hydrodynamic bearing system which eliminates whirl instability.

2. Description of the Related Art

The brushless DC motor, or spindle motor, has been commonly used in various applications wherein a precise rotating movement is required. These applications include a laser scanner and a disk drive motor. The laser scanner includes a mirror rotatable about an axis to deflect a laser beam for the projection of image rays to an exposure station to expose the surface of a moving photoreceptor. The scanner requires a high response speed to drive signals and precise angular positioning of the mirror.

The conventional brushless DC motor, however, has been found to exhibit large amplitude vibration under certain operating conditions. The motor typically includes a stator comprising a core having windings arranged thereabout, a rotor having spaced magnets positioned thereon and a shaft supporting the rotor at one end thereof. Bearings support the shaft in the radial and axial directions, the bearings being lubricated by a fluid.

Large amplitude vibration can be caused by imbalance, shaft flexibility, bearing flexibility, fluid film forces in the bearings as the shaft rotates, etc. One particularly common vibration mode occurs at approximately half the shaft rotation frequency. It has further been shown that half frequency vibration occurs when the radial load is small.

The related art has disclosed devices which attempt to reduce the problems associated with vibrational instability in such motors.

U.S. Pat. No. 4,657,803 to Von der Heide et al discloses an electric motor with a substantially cylindrical air gap between a stator and a rotor, the stator being fitted to a bearing support. The stator is connected to the bearing support by means of an elastic damper, the stator and bearing support being separated from one another by an air gap.

U.S. Pat. No. 4,135,119 to Broseris discloses a limited rotation motor having a stator and a rotor mounted for limited rotation relative to the stator. The stability of a radial rotor position in its support bearing is enhanced by an imbalance in the bias flux magnetic circuits which continually produce a resultant radial force on the rotor so that a well defined radial position of the rotor is maintained over the range of limited rotation.

U.S. Pat. No. 4,851,731 to Saotome et al discloses a brushless DC motor in which vibrations of a rotor axle are prevented without increasing manufacturing costs by providing the magnetic field between a stator and a rotor to be asymmetrical so that the magnetic attracting force of the rotor to the stator is also asymmetrical. The asymmetrical force causes the axle of the rotor to be urged in the same radial direction relative to an axle bearing in the stator, thus eliminating movements of the axle in radial directions. In a first embodiment, the magnitude of lateral forces exerted on the axle of the rotor can be varied in accordance with the height and area of a stepped portion. A second embodiment has an upper surface which is inclined at an angle with respect to rotor axle and bearing. A third embodiment has an inclined bearing which will incline axle at an angle with respect to the vertical to ensure that the axle will always be against one side of the bearing.

Other attempts at stabilizing rotational vibration in brushless DC motors include preloading the journal bearing on the shaft and applying a fixed direction radial load. Preloading may be accomplished in several different ways. For example, precise patterns can be formed on the surface of the journal or bearing, or the journal surface or bearing can be made out-of-round. The manufacturing tolerances in pattern formation are usually in the 0.001 inch range and very expensive to produce. Likewise, it is expensive to make the journal surface or bearing out-of-round. The application of a fixed direction radial load is shown in FIG. 1. Heretofore, this load application was performed by providing a stationary magnet, manufacturing different elements (see the above-mentioned U.S. Pat. No. 4,851,731), etc. The cost of the motor was therefore increased, additional installation time was required and the number of components required was increased.

In fluid-filled bearings, clearance is provided between a rotor shaft and bearing. it is difficult to avoid shaft vibrations relative to the bearing caused by this clearance. As wear occurs between the shaft and bearing, the clearance increases and, therefore, so does vibration. If a fluid is not used, either expensive ballbearings which burn, provide unacceptable noise, and wobble must be used or excessive wear caused by friction will result.

The related art thus attempts to achieve the elimination of vibration instability in a brushless DC motor by manufacturing in a more complicated manner or by the addition of parts.

OBJECTS AND SUMMARY OF THE INVENTION

Accordingly, one object of the present invention is to eliminate rotational instability in a brushless DC motor without requiring additional parts and/or labor.

Another object of the present invention is to eliminate rotational instability in a brushless DC motor without requiring a different type of manufacturing process.

A further object of the present invention is to eliminate rotational instability in a brushless DC motor without increasing the cost of the motor.

To achieve the foregoing and other objects, and to overcome the shortcomings discussed above, a brushless DC motor is provided in which rotational instability is eliminated. The motor includes a stator core having windings arranged thereabout, the stator core rotating about a first center line. The motor further includes a rotor having permanent magnets positioned about an inner diameter thereof, said rotor being positioned at one end of a rotatable shaft. The rotational axis of the rotor is eccentric to and parallel to the center line of the stator core such that magnetic forces are exerted on the stator core which eliminate rotational instability in the motor.

BRIEF DESCRIPTION OF THE DRAWINGS

The invention will be described in detail with reference to the following drawings in which like reference numerals refer, to like elements and wherein.

DETAILED DESCRIPTION OF THE PREFERRED EMBODIMENTS

Figure 1:
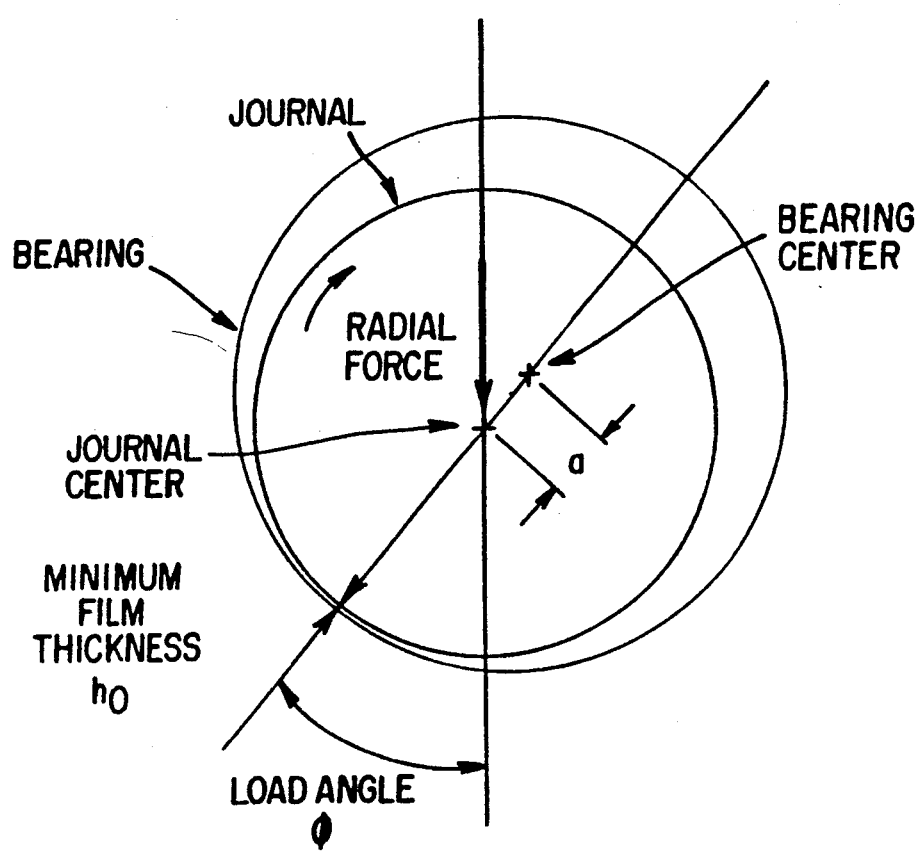
FIG. 1 illustrates the geometry of a 360° journal bearing.
Figure 2:
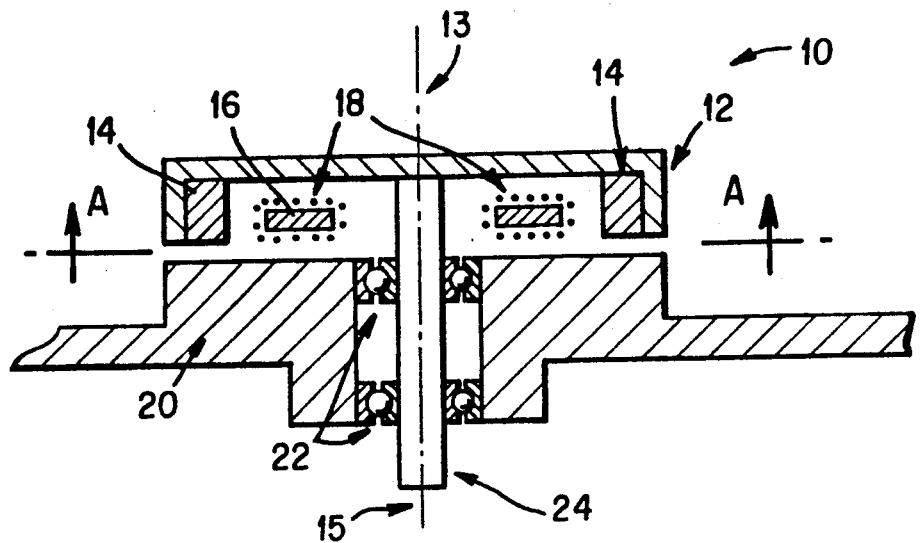
FIG. 2 is a cross-section of a conventional brushless DC motor.

Referring now to the drawings, and particularly to FIG. 2 thereof, there is shown a conventional brushless DC motor 10. Motor 10 includes a rotor 12 having a plurality of permanent magnets 14 equally spaced about its inner diameter. Rotor 12 is supported on shaft 24. A motor housing 20 includes a support shaft 24 positioned therein, shaft 24 having bearing surfaces 22 located thereon. Rotor 12 is rotatable about a center line 13. Motor 10 further includes a stator core 16 having windings 18 arranged thereabout. Stator core 16 is positioned about center line 15. As shown in FIG. 2, center lines 13 and 15 are coincident.

Figure 3:
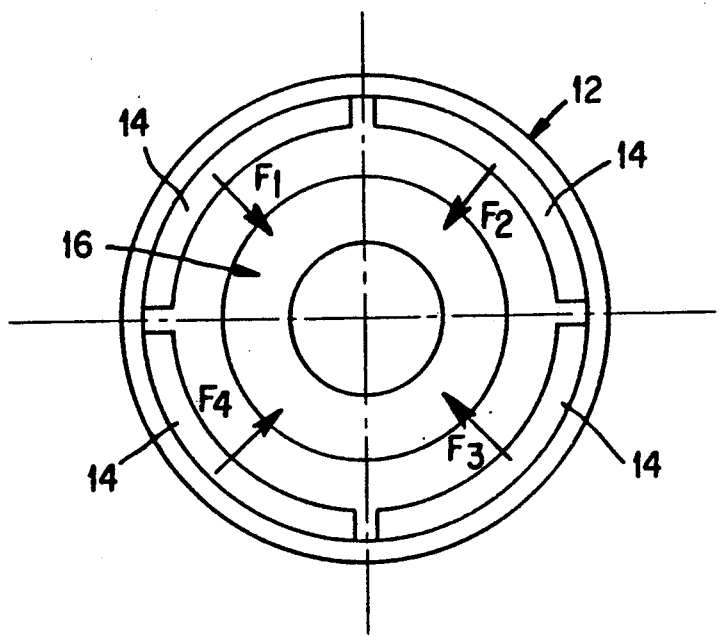
FIG. 3 is a cross-sectional view of the conventional brushless DC motor of FIG. 2 along Section A—A.

Each permanent magnet 14 in rotor 12 is attracted toward stator core 16. FIG. 3 illustrates the forces F, F2, F3 and F4 applied to rotor 12 by each magnet 14. Each of the forces has a component parallel to the rotational axis of rotor 12 (the axial load) and a component in the plane of rotation of rotor 12 (the radial load). The magnitude and direction of each force is proportional to the relative position of magnet 14 and stator core 16. When the center of stator 16 is aligned with the center of rotor 12, the spacing is the same at each magnet location. The sum of the radial forces is therefore zero. The axial forces sum to a finite value. If the shaft 24 is positioned vertically, the radial load due to gravity is also zero. Thus, in the conventional motor 10, the total radial load applied to the bearing surfaces 22 is zero and the shaft 24 will exhibit sub-synchronous whirl behavior.

Figure 4:
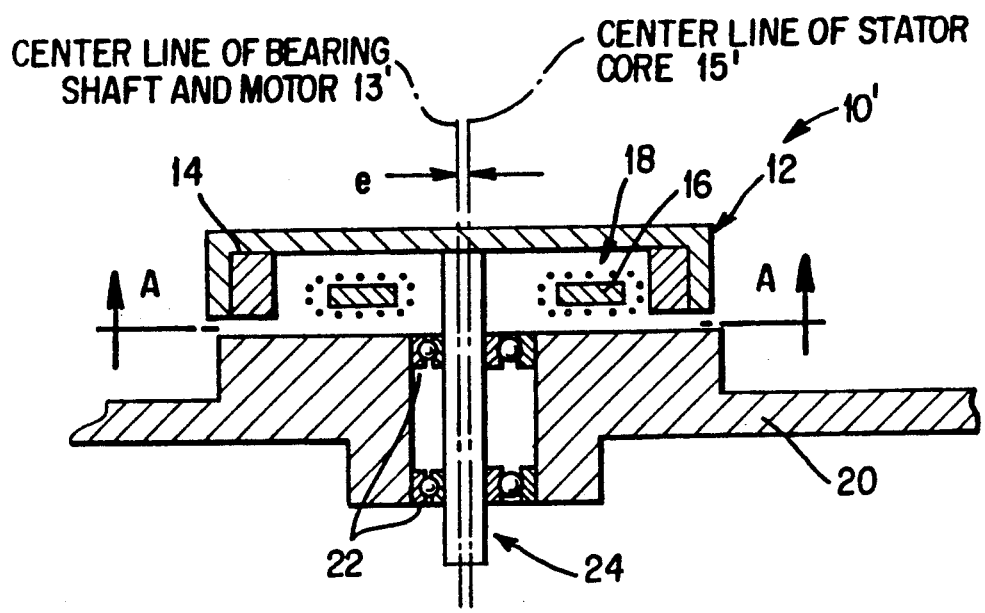
FIG. 4 is a cross-sectional view of a brushless DC motor according to the present invention.
Figure 5:
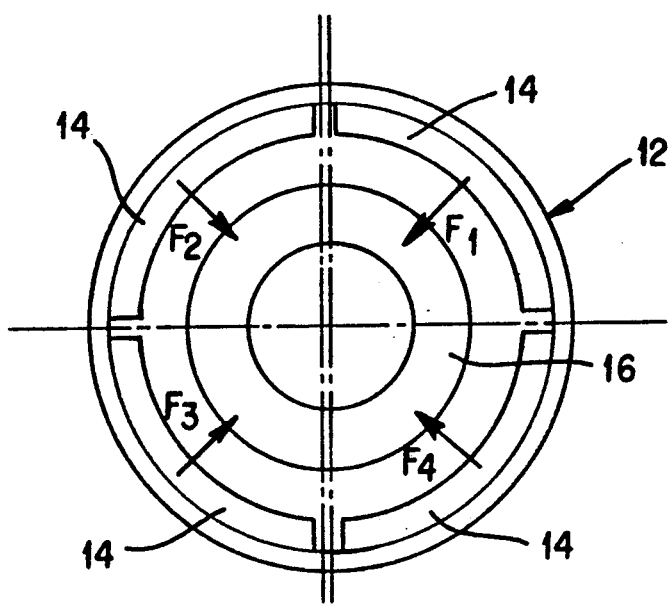
FIG. 5 is a cross-sectional view of the brushless DC motor of FIG. 4 along Section A—A.
Figure 6:
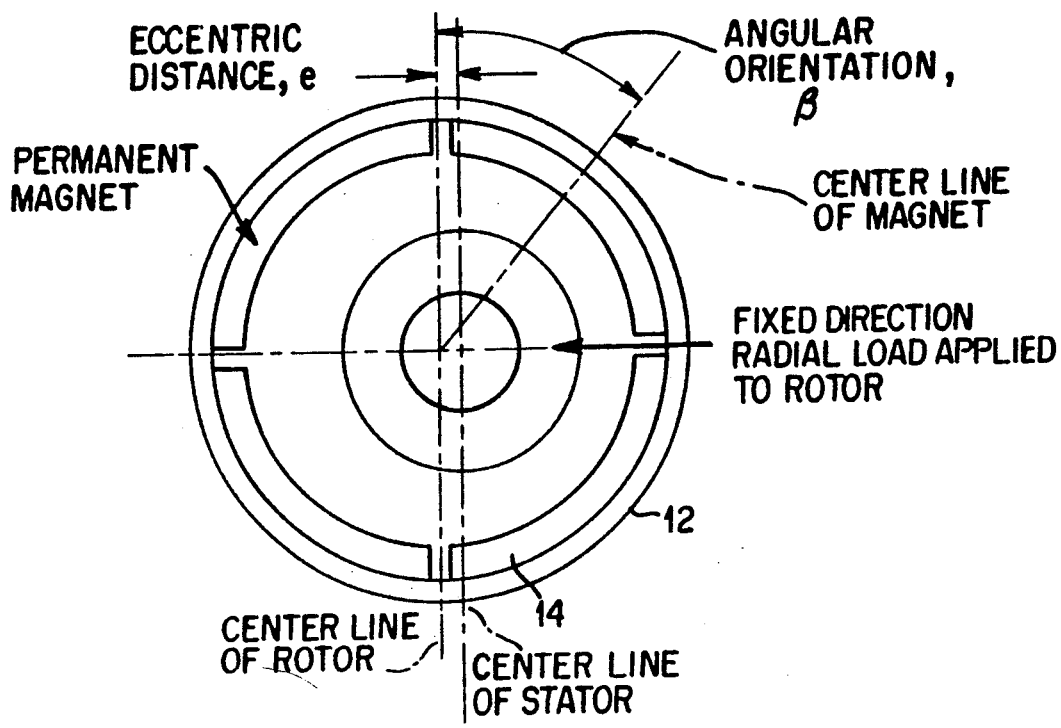
FIG. 6 illustrates radial load applied to the rotor of the motor of FIG. 4.
Figure 7:
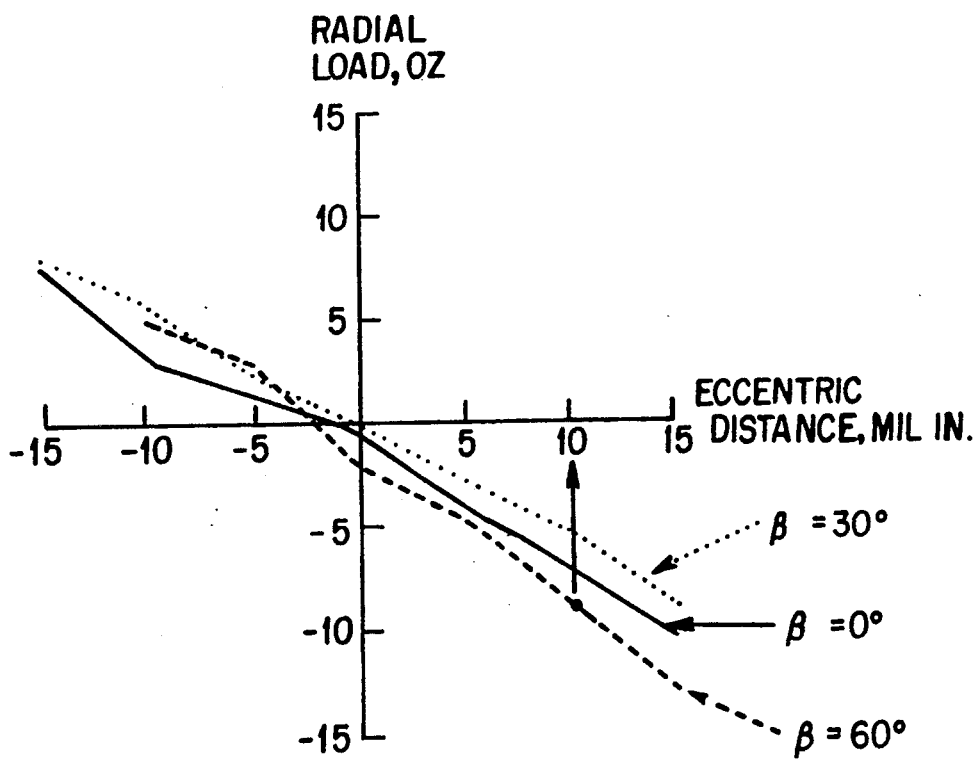
FIG. 7 shows a graph of radial load as a function of eccentric distance and angular orientation of the rotor.

A brushless DC motor according to the present invention is shown in FIG. 4. This embodiment is identical to the conventional embodiment with one exception. The center line about which rotor 12 rotates is at 15'. Center lines 13' and 15' are parallel to and eccentric to one another, center line 13' being slightly offset from center line 15' by a distance e. The radial force at each magnet location is no longer equal, but varies in proportion to the local spacing between magnet 14 and stator core 16. In this geometry, the vector sum of the radial forces is non-zero. Consequently, a fixed direction radial load is applied to rotor 12. This radial load is used for journal bearing preload and stabilization. The fixed direction radial load is illustrated in FIG. 6. FIG. 7 shows a graphical representation of the fixed direction radial load applied to a brushless DC motor manufactured by SYNETRON Corporation (part no. 100680). The axial load which acts to pull rotor 12 toward housing 20, was approximately two pounds. The measured radial load as a function of eccentric distance between the stator core center line and rotor center line and the angular orientation of rotor 12 is illustrated. As rotor 12 rotates at a fixed eccentric distance, the radial load varies. At an eccentric distance of +0.010 inch, an 8 oz. ±2 oz. radial load is applied to rotor 12.

Figure 8:
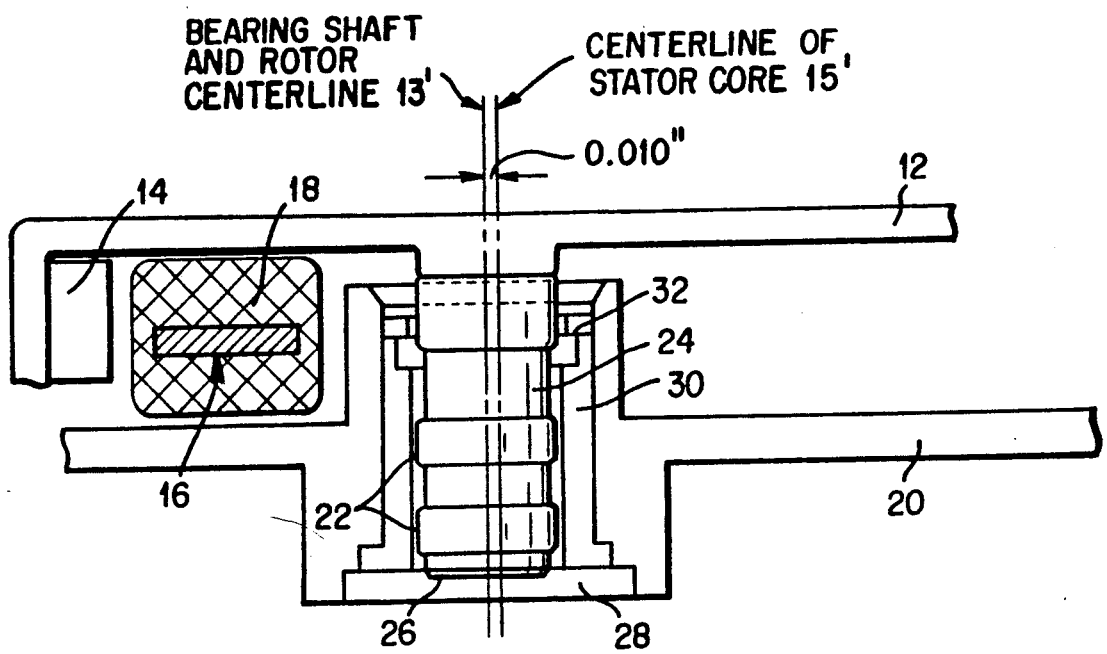
FIG. 8 is a cross-sectional view of the load support system of the brushless DC motor of FIG. 4.

FIG. 8 illustrates a stable load support system used in the motor of FIG. 4. Shaft 24 has journal surfaces 22 provided thereon. Bearing 30 supports and stabilizes the radial load provided by shaft 24 and journal surfaces 22. The design requirements of the load support system of the above-mentioned SYNETRON motor are as follows:

Design Volume: stock SYNETRON motor assembly, part number 010680
Radial load: 4 oz. per bearing
Axial load: 2 lbs.
Operating Speed: 5000 RPM
Total weight of rotating parts: 0.25 lb.
Bearing power consumption: 5 W or less
Near zero lubricant leakage.

As determined by the FIG. 7 graph, at an eccentric distance of +0.010 inch, an 8 oz. ±2 oz. radial load is applied to rotor 12. The center line 13' of shaft 24 is therefore offset from the center line 15' of stator core 16 by a distance of +0.010 inch. The journal surfaces 22 are then stabilized by the resulting 4 oz. (per bearing) radial load. The 2 lb. axial load is supported by a six pad stepped sector hydrodynamic thrust bearing 26. Thrust bearing 26 is positioned on the surface of a flat, disk-shaped end cap 28. Journal surfaces 22 and thrust bearing 26 are lubricated, for example, by ferrofluid sealed within housing 20. Magnetic seal 32 can be used to seal the lubricant.

Magnetic seal 32 is a low-cost, two stage seal used to contain the ferrofluid lubricant within housing 20. The seal 32 provides long life and near zero lubricant leakage. The seal operates with a radial clearance of approximately 0.002 in. and is commercially available. A seal manufactured by NSK Corporation, part no. MGS-2408BW can, for example, can be used.

The ferrofluid lubricant should be of a high viscosity because of its high damping and stiffness. As the viscosity of the lubricant used increases, however, the bearing drag torque, and consequently the torque required from the motor 10', also increases. The maximum absolute viscosity is chosen here so that at 50° F., the total bearing drag torque does not exceed 4 in.-oz. Using Petroff's equation for the journal bearings and Archibald's results for the thrust bearing, the following limit of maximum absolute viscosity is obtained:

$$\mu \leq 1080 \text{ cp, at } 50°.$$

Assuming that the lubricant is a synthetic di-ester, the viscosity at an operating temperature of 110° F. should not exceed 350 cp.

Figure 9:
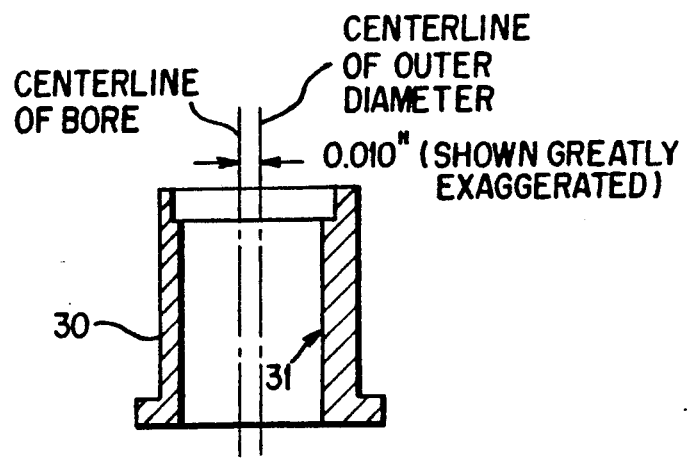
FIG. 9 is a cross-sectional view of a bearing having a bore provided in an off center location.

As illustrated in FIG. 9, bearing 30 is used to achieve the offset between center lines 13' and 15'. The figure illustrates bore 31 of bearing 30 being machined 0.010 inch off center. Bore 31 and the outer diameter of bearing 30 are both circular. The bearing, therefore, does not require any additional machining tools. The offset could be achieved using alternative methods such as placing a shim on the outer diameter of bearing 30.

The performance of journal surfaces 22 and bearing 30 has been tested as follows:

When the shaft 24 is rigid in comparison with the bearing stiffness, the following expression for the shaft speed at which translatory half-frequency whirl should begin is given by:

$$f_t = 1/\pi \sqrt{(K_2/M)} . \quad (1)$$

where:
$f_t$ is the shaft speed at which translatory half frequency whirl should occur;
M is the mass of the rotor/polygon assembly applied to one bearing, lb-sec$^2$/in.; and
$K_2$ is the radial stiffness of the bearing film for one bearing, obtained by solving the load equation for the radial film force, lb/in.

Equation (1) has shown satisfactory correlation between predicted whirl threshold speeds and actual speeds at which the instability was observed to begin.

To eliminate the possibility of half-frequency translatory whirl, the stiffness $K_2$ is chosen so that $f_t$ is several times higher than the operating speed. For $f_t$ three times higher than the operating speed:

$$K_2 > 200 \ lb/in. \quad (2)$$

The radial film stiffness is a function of the journal bearing geometry, lubricant viscosity and load. A journal bearing geometry and lubricant viscosity that provides a radial film stiffness greater than 200 lb./in. under a 4 oz. radial load is sought.

Other details of journal bearing performance were investigated analytically. These include runout, power consumption and conical whirl. In each instance, performance was found to be satisfactory.

The typical design details of the journal surfaces 22 and bearing 30 of motor 10' are as follows:
Nominal journal bearing diameter (in.): 0.310;
Bearing length (in.) 0.075;
Radial clearance (in.): 0.0010+0.0, −0.0005;
Lubricant viscosity: 200 cp;
Power consumption at 5000 RPM: 0.5 W (each brg);
Non-repeatable runout: 50μ in.;
Radial stiffness, $K_2$, under 4 oz. radial load: 325–625 lb/in.

Figure 10:
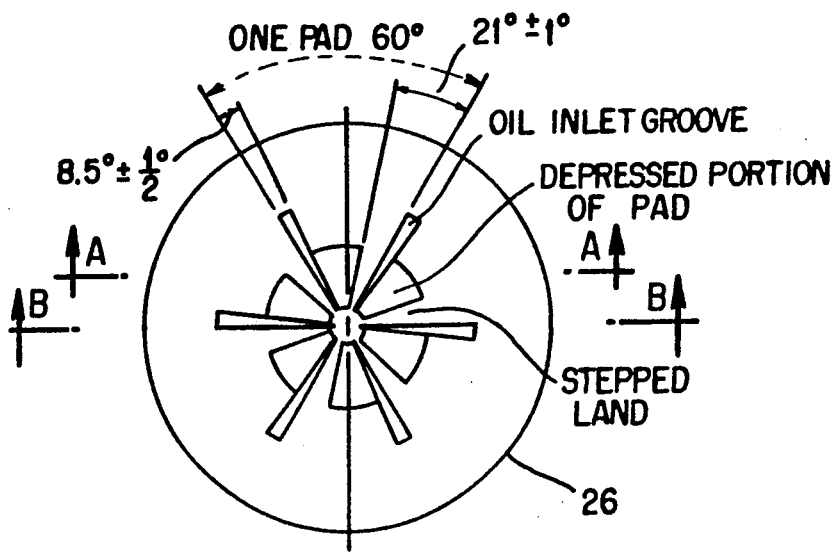
FIG. 10 is top view of a thrust bearing of FIG. 8.
Figure 15:
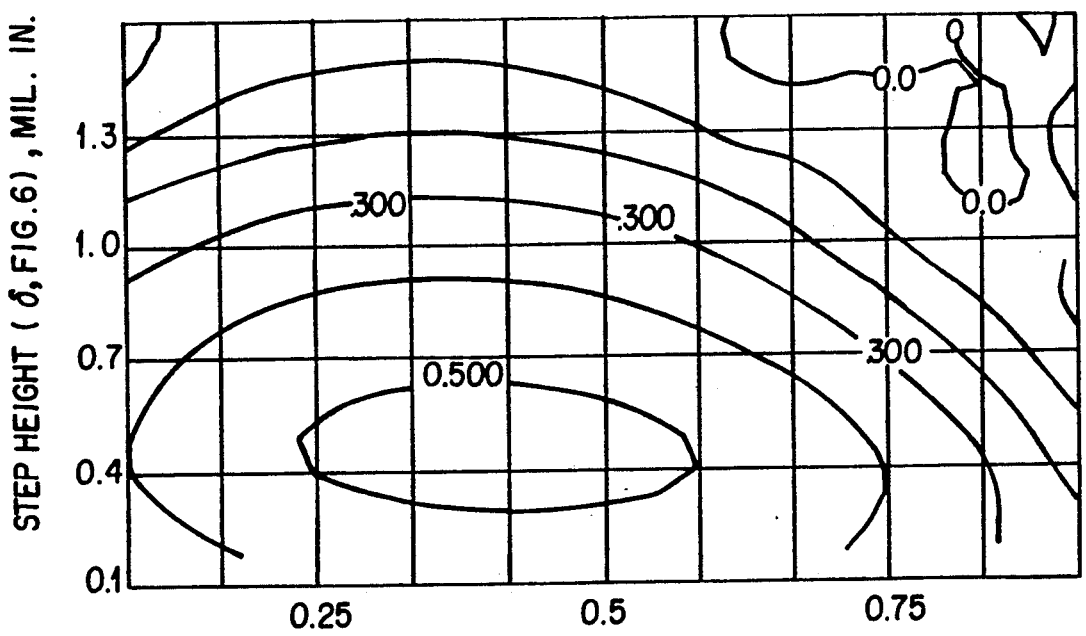
FIG. 15 illustrates the contours of constant minimum film thickness for a stepped sector thrust bearing.
Figure 11:
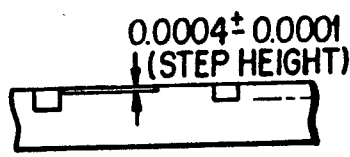
FIGS. 11 and 12 are cross-sectional views along lines A—A and B—B, respectively, of the thrust bearing of FIG. 10.
Figure 12:
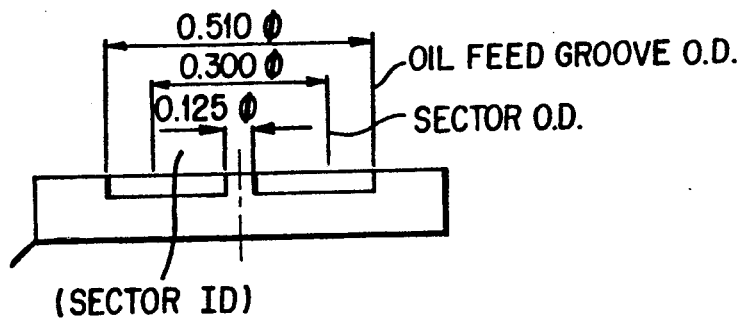
Figure 13:
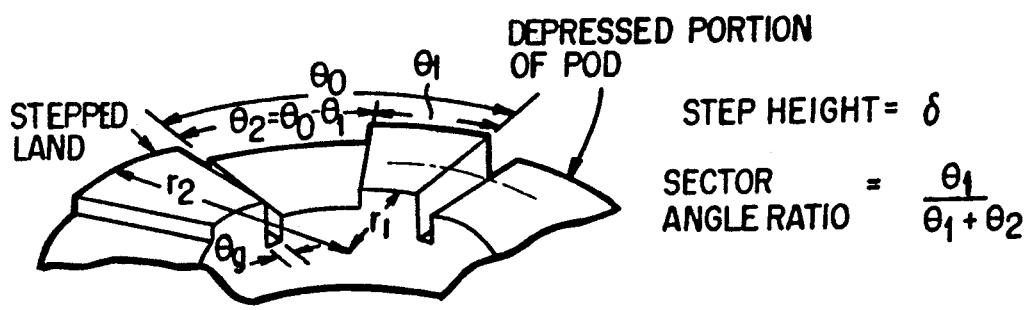
FIG. 13 is a perspective view of the thrust bearing of FIG. 10.
Figure 14:
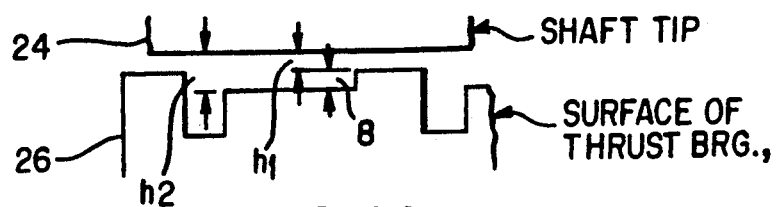
FIG. 14 is a cross-sectional view of the thrust bearing as it engages the motor shaft.

A detailed description of thrust bearing 36 is provided in FIGS. 10–14. Thrust bearing 26 is a six pad, stepped sector hydrodynamic thrust bearing, each pad extending 60° as shown in FIG. 10. Bearing 26 has a plurality of stepped portions as best shown in FIGS. 13 and 14. Thrust bearing 26 supports the 2 lb. axial load imposed on rotor 12 by magnets 14. Because the axial load is always in one direction, only a single direction thrust bearing 26 is needed. The thrust bearing of FIG. 10 is the type preferably used for a single direction of rotation as it is simple to manufacture and design. It can further easily be optimized for particular purposes. Geometry is easily obtained which maximizes film thickness and manufacturing tolerance range as shown in the contour plot of FIG. 15. Values of the sector angle ratio are shown on the horizontal axis and step height is shown on the vertical axis. As illustrated by the contour plot, a maximum film thickness of 0.006 inch is obtained for a sector ratio of approximately 0.4 and a step height of 0.0004±0.0001 inch. The details of thrust bearing 26 are summarized below:
Inner radius: 0.062 in.;
Step height: 0.004±0.0001 in.;
Minimum film thickness: 0.0006 in.;
Power consumption at 5000 RPM: 0.9 W;
Outer radius: 0.150 in.;
Sector angle ratio $(\theta_1/\theta_1+\theta_2)$: 0.41;
Operating torque at 5000 RPM: 0.25 in. oz.; and
Lubricant viscosity: 200 cp.

EXPERIMENTAL EVIDENCE

Figure 16:
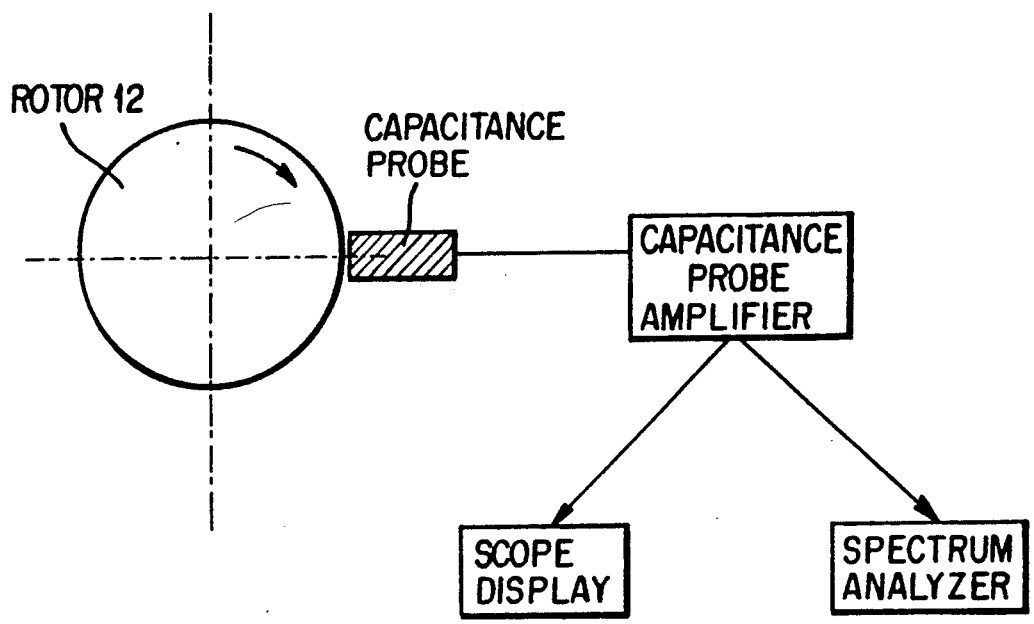
FIG. 16 illustrates a schematic block diagram of an apparatus for the measurement of half frequency whirl vibration amplitude.

Experiments were performed to confirm the stability of the brushless DC motor 10' having a hydrodynamic bearing system. In these experiments, the dynamic position of rotor 12 was measured at many operating speeds. Position was measured by placing a capacitance probe near the outer surface of the rotor as illustrated in FIG. 16. The frequency spectrum of the analog position signal is computed by a spectrum analyzer. Thus, the amplitude of the whirl vibration which occurs at half the operating frequency can be measured as a function of the operating speed and other parameters.

Experiments were performed on both motors 10 and 10'. In motor 10, the rotor and stator center lines 13 were coincident, as shown in FIG. 2, and the lubricant viscosity was 40 cp. In motor 10' the rotor center line was offset from the stator center line by 0.010 inch, as shown in FIG. 4, and the lubricant viscosity was approximately 250 cp. The bearing geometry in both systems conforms to the design requirements set forth above. Detailed descriptions of each system are as follows:

CONVENTIONAL BEARING SYSTEM dimension e =0.0

Journal nominal diameter: 0.310 in.
Journal bearing radial clearance: 0.00085±0.0001 in.
Lubricant viscosity at 110° F.: approximately 40 cp

BEARING SYSTEM WITH OFFSET CENTER LINE dimension e =0.010 in.

Figure 17:
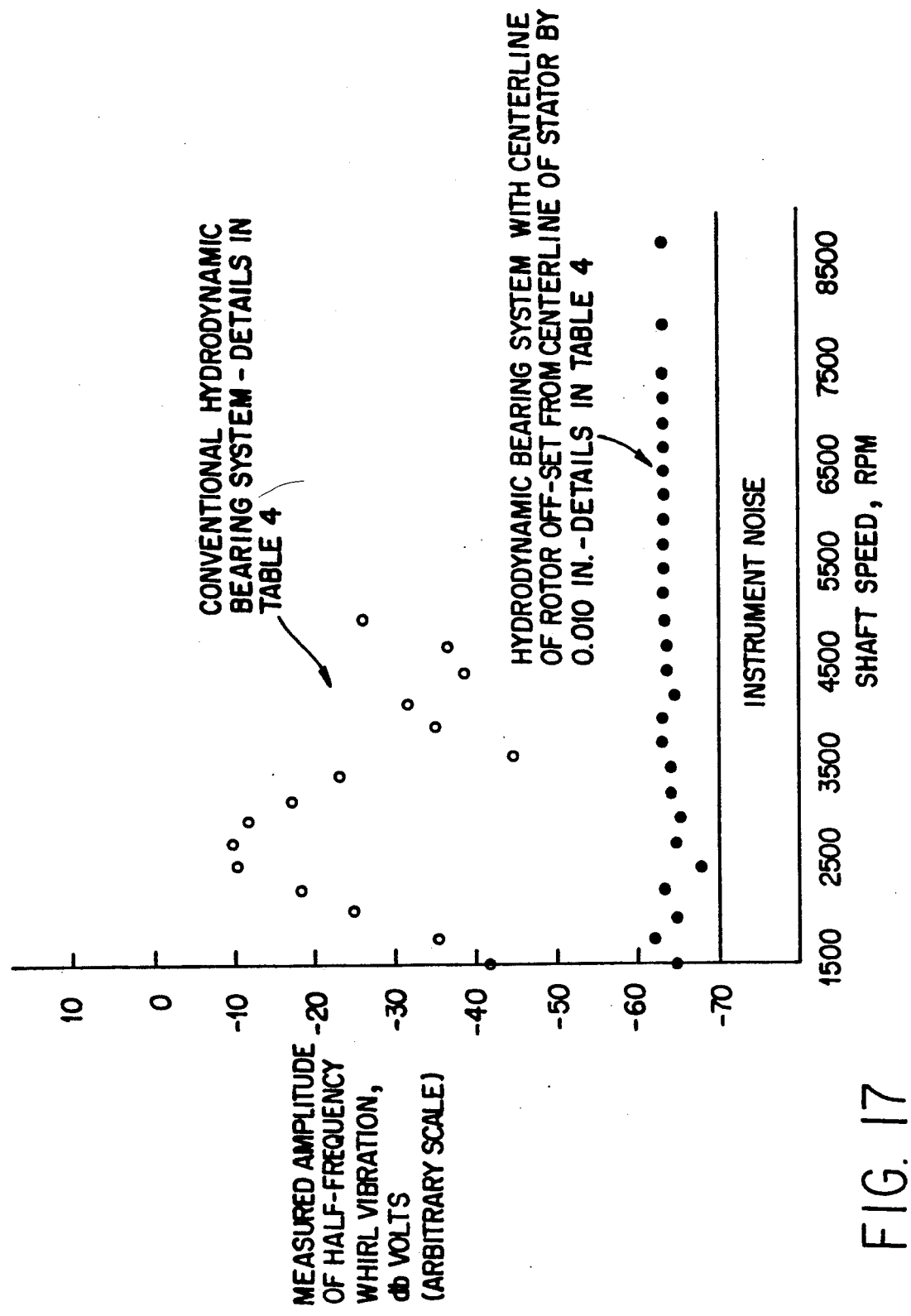
FIG. 17 shows a graph of measured half frequency whirl amplitude as a function of shaft speed.

Journal nominal diameter: 0.310 in.
Journal bearing radial clearance: 0.00085±0.0001 in.
Lubricant viscosity at 110° F.: approximately 250 cp The measured effects of offset rotor geometry and lubricant viscosity on half-frequency whirl vibration are shown in FIG. 17. A measured amplitude of 0 dbV roughly corresponds to a 0.001 in. peak-to-peak amplitude vibration. Twenty units on the vertical scale correspond to one order of magnitude. Thus, a 2 to 3 order of magnitude attenuation of half-frequency whirl amplitude was obtained over the conventional design. The measured data clearly shows that the present invention eliminates half-frequency whirl.

Particular applicability of the above described brushless DC motor 10' is in a laser scanner used for printing purposes. Such a scanner includes a polygon mounted on the upper surface of rotor !2. The outer edges of the polygon are mirrored and rotate about the rotor axis. The mirrored edges serve to reflect and scan the modulate beams of light on a surface of a photoreceptor drum. Accuracy in manner and speed of operation are extremely important. It is desirable that the scanner run very accurately, last for a long period of time and be relatively quiet in its performance. Because of problems associated with rotational instability, accurate prior art laser scanners were expensive to build. The present invention, by contrast, because of the low cost elimination of rotational instability, enables increased accuracy in how the rotor spins, i.e., no more wobbling.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

WHAT IS CLAIMED IS:

1. A brushless DC motor comprising:
   a stator comprising a core positioned about a first center line, said core having windings arranged thereabout;
   a rotor having an inner diameter being rotatable about a second center line;
   a shaft supporting said rotor at one end thereof and having an axis collinear with said second center line;
   magnet means positioned about the inner diameter of said rotor for exerting radial and axial magnetic load forces on said stator;
   said first center line of said stator being eccentric to said second center line of said rotor.

2. The motor as recited in claim 1, wherein:
   said first center line of said stator is eccentric to and parallel to said second center line of said rotor.

3. The motor as recited in claim 1, wherein:
   said magnet means comprise a plurality of permanent magnets.

4. The motor as recited in claim 3, wherein:
   said permanent magnets are equally spaced around the inner diameter of said rotor.

5. The motor as recited in claim 2, wherein
   said first center line is eccentric to said second center line by a distance of about 0.010 inch.

6. The motor as recited in claim further comprising:
   a motor housing, and bearing means for supporting said shaft within said housing.

7. The motor as recited in claim 6, wherein:
   a lubricant is provided in said housing for lubricating said bearing means.

8. The motor as recited in claim 7, wherein:
   said lubricant is a ferrofluid.

9. The motor as recited in claim 7, wherein:
   said housing includes a magnetic seal which seals the lubricant within said housing.

10. The motor as recited in claim 1, wherein:
    said bearing means includes a pair of journal surfaces which support the radial load forces, the journal surfaces extending around said shaft.

11. The motor as recited in claim 1, wherein
    said bearing means includes a thrust bearing which supports the axial load force, the thrust bearing being located adjacent to an end of said shaft.

12. The motor as recited in claim 11, wherein:
    said thrust bearing is a six-pad stepped sector hydrodynamic thrust bearing.

13. The motor as recited in claim 11, wherein:
    said thrust bearing is provided on an end cap of said housing.

14. The motor as recited in claim 13, wherein:
    said end cap is flat and disk-shaped.

15. The motor as recited in claim 1, further comprising:
    said rotor supporting at least one reflective surface.

16. A brushless DC motor for use in a laser scanner comprising:
    a stator comprising a core positioned about a first center line, said core having windings arranged thereabout;
    a rotor having an inner diameter and being rotatable about a second center line;
    a shaft supporting said rotor at one end thereof and having an axis collinear with said second center line;
    magnet means positioned about the inner diameter of said rotor for exerting radial and axial magnetic load forces on said stator;
    said first center line of said stator being eccentric to said second center line of said rotor.

17. The motor as recited in claim 16, wherein:
    said center line of said stator is eccentric to and parallel to said center line of said rotor.

18. The motor as recited in claim 16, wherein:
    said magnet means comprise a plurality of permanent magnets.

19. The motor as recited in claim 18, wherein:
    said permanent magnets are equally spaced around the inner diameter of said rotor.

20. The motor as recited in claim 17, wherein:
    said stator center line is eccentric to said rotor center line by a distance of about 0.010 inch.

21. The motor as recited in claim 16, further comprising:
    a motor housing, and bearing means for supporting said shaft within said housing.

22. The motor as recited in claim 21, wherein:
    a lubricant is provided in said housing for lubricating said bearing means.

23. The motor as recited in claim 22, wherein:
    said lubricant is a ferrofluid.

24. The motor as recited in claim 22, wherein:
    said housing includes a magnetic seal which seals the lubricant within said housing.

25. The motor as recited in claim 16, wherein:
    said bearing means includes a pair of journal surfaces which support the radial load forces, the journal surfaces extending around said shaft.

26. The motor as recited in claim 16, wherein
    said bearing means includes a thrust bearing which supports the axial load force, the thrust bearing being located adjacent to an end of said shaft.

27. The motor as recited in claim 26, wherein:
    said thrust bearing is a hydrodynamic thrust bearing.

28. The motor as recited in claim 26, wherein:
    said thrust bearing is provided on an end cap of said housing.

29. The motor as recited in claim 28, wherein:
    said end cap is flat and disk-shaped.

30. The motor as recited in claim 16, further comprising:
    said rotor supporting at least one reflective surface.

* * * * *